Jan. 7, 1964 — B. L. POLKOSNIK — 3,116,783
DRAPERY-SUSPENDING AND PLEAT-RETAINING DEVICES
Filed July 3, 1956 — 2 Sheets-Sheet 2
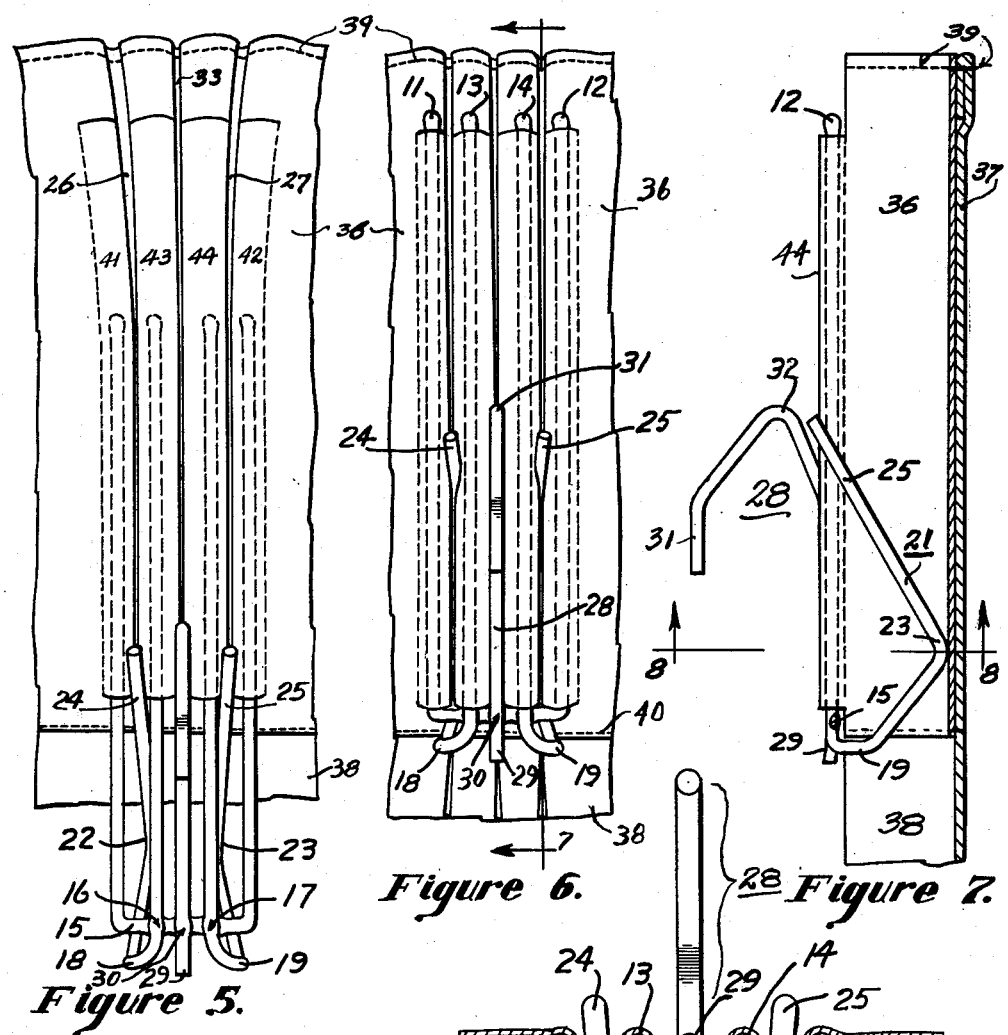
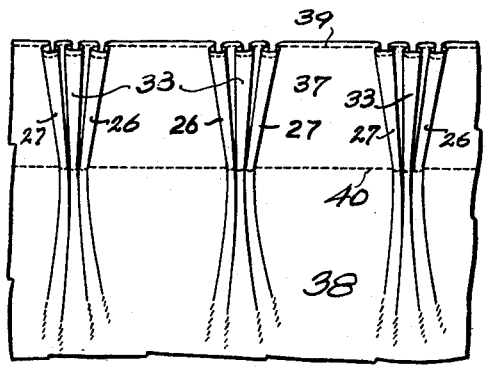
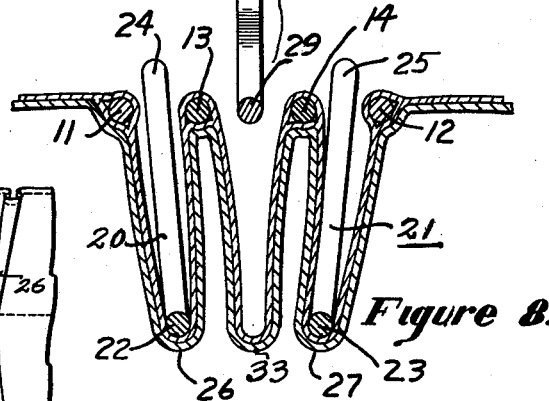
INVENTOR.
BERNARD L. POLKOSNIK
BY Leonard L. Kalish
ATTORNEY.

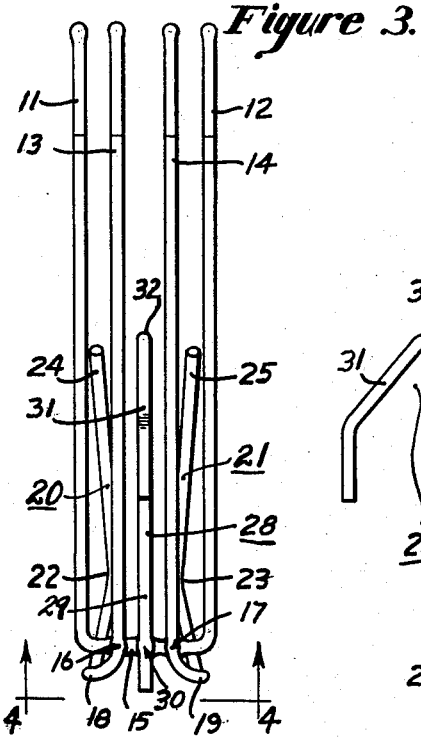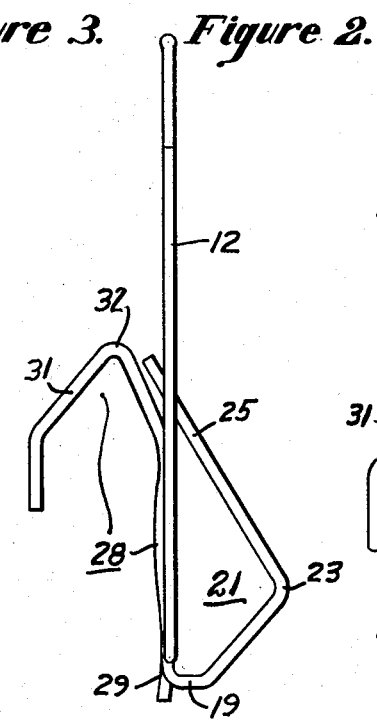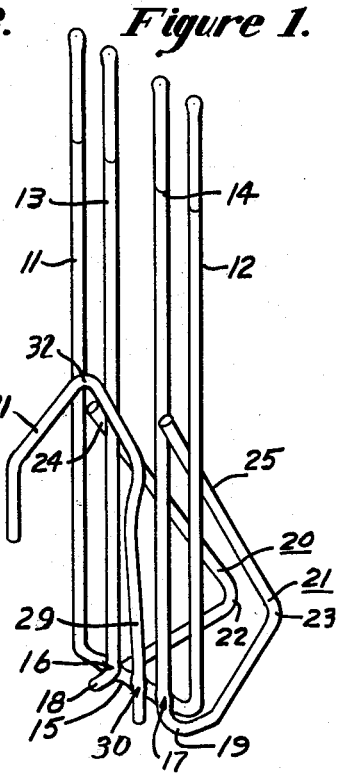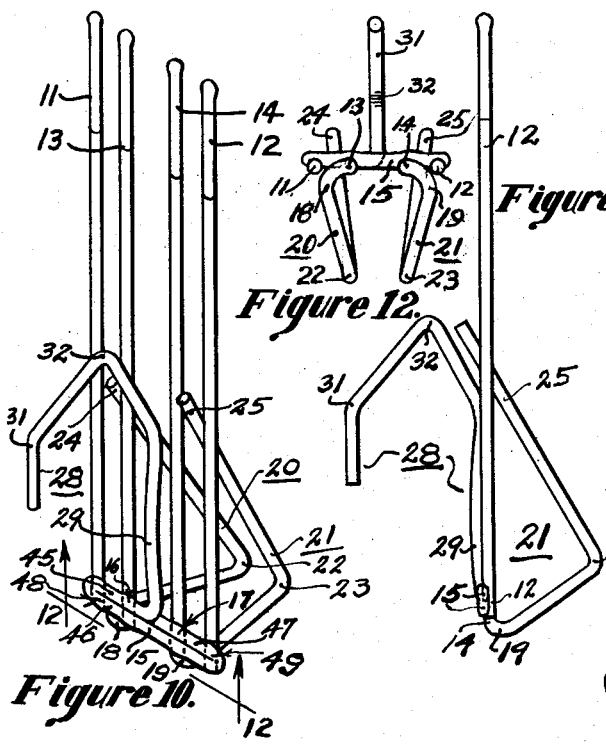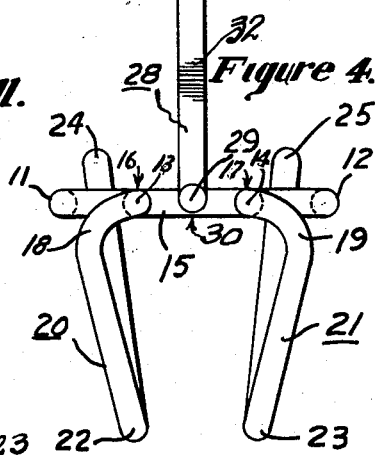

United States Patent Office

3,116,783
Patented Jan. 7, 1964

3,116,783
DRAPERY-SUSPENDING AND PLEAT-RETAINING DEVICES
Bernard Leonard Polkosnik, Fairfield, Conn., assignor to Conso Products, Inc., a corporation of New York
Filed July 3, 1956, Ser. No. 595,663
1 Claim. (Cl. 160—348)

The present invention relates particularly to drapery-suspending and pleat-retaining devices of the type having stationary pleat-pinching members entering the rearwardly-opening front-folds of the pleat.

The object of the present invention is to better retain the pleats in their desired form by pinching the lower portions of the pleats together, near the lower ends of the front-folds thereof and also to form a more durable device of this type and one which is more reliable in operation and easier to insert and to apply effectively.

The accompanying drawings in which like reference characters indicate like parts, FIGURE 1 represents a perspective view of a drapery-suspending and pleat-retaining device representing one embodiment of the present invention.

FIGURE 2 represents a side elevational view of the same.

FIGURE 3 represents a rear elevational view of the same.

FIGURE 4 represents a bottom plan view of the same, on line 4—4 of FIGURE 3.

FIGURE 5 represents a rear elevational view of the head of the drapery, with the pleater-tape sewn thereto and with the fingers of a drapery-suspending and pleat-retaining device of the present invention partly inserted into the pockets of the tape.

FIGURE 6 represents a similar rear elevational view, with the fingers fully inserted into the pockets.

FIGURE 7 represents a section on line 7—7 of FIGURE 6.

FIGURE 8 represents a section on line 8—8 of FIGURE 7.

FIGURE 9 represents a front elevational view of the drapery, in its pleated formation.

FIGURE 10 represents a perspective view of a modified embodiment of the present invention.

FIGURE 11 represents a side elevational view of the same.

FIGURE 12 represents a cross-section on line 12—12 of FIGURE 10.

The drapery-suspending and pleat-retaining device of the present invention includes the two outer fingers 11 and 12 and the two inner fingers 13 and 14 connected at their lower ends. The two outer fingers 11 and 12 may be connected to each other by the cross-bar 15 formed integrally therewith, as in the embodiment shown in FIGURES 1 to 7, or welded thereto at their lower ends, as in the embodiment shown in FIGURES 10 to 12.

The two inner fingers 13 and 14 are welded, at their lower ends, at the points 16 and 17, to the cross-bar 15, and the wire of which said inner fingers 13 and 14 are formed is then continued forwardly in lower bends 18 and 19, which bends first flare outwardly (as indicated in FIGURES 3 and 4) and then extend forwardly and upwardly (as indicated in FIGURES 1 and 2), to form the pleat-pinching and pleat-shaping or pleat-posturing members designated generally by the numerals 20 and 21, having the forwardly projecting elbows 22 and 23 and having rearwardly and upwardly extending portions 24 and 25 which extend between the fingers 11 and 13 and between the fingers 12 and 14, respectively, to a point rearwardly of the median plane common to the fingers 11 to 14 (as indicated particularly in FIGURES 1, 2 and 4 and in FIGURES 10, 11 and 12). The elbows 22 and 23 are preferably closer to each other than the bends 18 and 19 and are also preferably closer to each other than the rear ends 24 and 25 of the pleat-pinching members 20 and 21 (as indicated, for instance, in FIGURES 3, 1 and 4 and in FIGURES 10 and 12); the spacing between the pleat-pinching elbows 22 and 23 being preferably generally the same as or slightly greater than the spacing between the inner fingers 13 and 14, so as to cause the elbows 22 and 23 to pinch the two rearwardly-opening front-folds 26 and 27 of the pinch pleat or triple pleat; that is to hold them more closely together at the front of the triple pleat.

The drapery-suspending and pleat-retaining device of the present invention is formed of any suitable wire, as, for instance, a hard-drawn steel wire of relatively low carbon content, and of suitable thickness, as, for instance, having a diameter of 0.080", more or less, and having appreciable resiliency and form-retaining properties.

In the embodiment shown in FIGURES 1 to 7, the suspension member 28 has its stem 29 welded to the cross-bar 15, at 30. The suspension member 28 extends upwardly from the stem 29 thereof and may terminate in a hook or ring 31 disposed rearwardly of the median plane common to the fingers 11 to 14, with its bight 32 located at any suitable height according to the style of drapery (or curtain) installation, namely, whether the curtain-rod or traverse-rod or mechanism is fastened to the wall or other vertical surface, and its distance from the ceiling, or whether it is fastened to the ceiling, and whether a valance is used to conceal the curtain-rod traverse mechanism and the upper edge of the drapery, or whether the "head" of the drapery or curtain is to conceal the curtain-rod or traverse-rod.

In the modified embodiment shown in FIGURES 10 to 12, inclusive, instead of forming the cross-bar 15 integrally with the two outer pleat-retaining fingers 11 and 12 (as in the embodiment shown in FIGURES 1 to 7, inclusive), the cross-bar 15 is formed integrally with the drapery-suspending or curtain-supporting member 28, by extending the lower end of the stem 29 thereof horizontally to form the upper horizontal portion 45 and then bending it back upon itself to form the lower horizontal portion 46 and then bending it again back upon itself to form the upper horizontal portion 47. The free end of the upper horizontal portion 47 may be merely abutted against the bend between the stem 29 and the upper horizontal portion 45 or it may be welded thereto.

To this composite cross-bar 15 (FIGURES 10 to 12) the lower ends of the outer fingers 11 and 12 are welded, as at 48 and 49, and the lower ends of the inner fingers 13 and 14 are welded thereto at 16 and 17.

Some or all of the fingers 11 to 14 may be welded either to the front face of this composite cross-bar 15, as shown in FIGURES 10 to 12, or they may be welded to the rear face thereof. If the inner fingers 13 and 14 are welded to the rear face thereof, then bends 18 and 19 will extend beneath and across the composite cross-bar 15 (in a manner similar to that shown in FIGURES 1, 2 and 3), while if they are welded to the front face thereof, as in FIGURES 10 to 12, the bends 18 and 19 will not pass beneath the cross-bar.

The tape 36 is sewn to the top or "head" 37 of the drapery 38 as shown in FIGURES 5 to 8, in a suitable manner, as, for instance, by the rows of sewn stitches 39 and 40. The portion of the drapery 38 below the "head" is broken away in FIGURES 5 to 7 and in FIGURE 9.

The four fingers 11, 12, 13 and 14 are then inserted, upwardly, into the pockets 41, 42, 43 and 44, as indicated in FIGURES 5 to 8 after the "head" 37 of the drapery (and the tape 36 sewn thereto) have been manually folded back and forth to form multi-fold pleats with the pockets 41 to 44 on the rear-folds thereof, as indicated in FIGURES 5 to 8.

While being so inserted, the two stationary elbow-shaped pleat-posturing and pleat-pinching members 20 and 21 enter the two outer rearwardly-opening front-folds 26 and 27 of the pleat (having three front-folds), in the manner indicated particularly in FIGURES 5 to 8. When the fingers have been fully inserted, the lower edges 48 of the pockets 41 to 42 abut against the cross-bar 15, as indicated, for instance, in FIGURE 6.

In some of the drawings, particularly FIGURES 7 and 8, the parts are much enlarged, and the fabric portions are out of proportion, so as to permit the showing of the several layers of fabric, namely, the drapery fabric 37 and the tape 36. The clearances between the several folds may be substantially less than that indicated in FIGURE 8, because the "head" part of the drapery is generally two or more layers of fabric (rather than a single layer as indicated in FIGURES 7 and 8, for simplicity in illustration), and the combined thickness of these several layers of fabrics, and of the tape 36 and pocket-walls thereof, permit the elbows 22 and 23 to pinch or hold the front-folds 26, 27 and 33 more closely together than indicated in FIGURE 8.

The stationary elbows 22 and 23 are substantially above the cross-bar 15 as indicated in FIGURES 1 to 3 and in FIGURES 5 and 7. This gives to the front-folds 26, 27 and 30 the desired posture.

In the areas or zones where the wires cross each other and are welded to each other, the wires are preferably deformed by the welding, by the simultaneous application of suitable welding-current and mechanical pressure, so that in addition to the wires being to each other (as, for instance, at points 16, 17, 30, 48 and 49) the wires merge into each other in these cross-over zones or weld-zones, so that the overall thickness in these zones is substantially less than twice the diameter of the wire (and may be not substantially more than said diameter), so that the four pleat-retaining fingers will be in generally the same plane (as indicated, for instance, in FIGURES 2, 7 and 8). Likewise, the stem 29 of the suspending member 28, may also be more nearly in the plane of the fingers (11 to 14) as indicated, for instance, in FIGURES 2 and 11.

While in the accompanying drawings the drapery-suspending member or drapery-supporting member is shown in the form of a hook, it is to be understood that a round eyelet-like or ring-like terminal portion may be used in place of the open-ended hook 31. Thus, for instance, where the drapery-suspending member or curtain-suspending member (which includes the stem 29 and the rearwardly extending portions 33, 32 and 31) is to be used on a simple curtain-rod (as distinguished from a traverse-rod having laterally movable hangers riding riding therein or thereon, into which the hooks are to be hooked), the portion of the drapery or curtain suspending member 28 which is rearwardly of the fingers (11 to 14) may be formed as a round eyelet or ring, to be laced onto the curtain-rod. Hence, where the word "supporting-hook" or "suspension-hook" is used, it is intended to comprehend both an open-ended hook as well as a partly or completely closed ring.

In the use of the drapery-suspending and pleat-retaining device of the present invention, the "head" of the drapery or curtain, having spaced vertical pockets along the inner face thereof, is first folded to and fro, manually, to form a multi-fold pleat, such as a triple pleat (variously called a "pinch pleat" or a "French pleat") with the pockets disposed on the rear-folds, and the fingers of the device are then inserted into the pockets for retaining the rear-folds of such "pleat." During this insertion, the stationary pleat-posturing and pleatpinching members 20 and 21 enter the two outer rearwardly-opening front-folds 26 and 27.

While in FIGURES 4 to 8 the spacing between the elbows 22 and 23 is shown as being about the same as or slightly greater than the spacing between the inner fingers 13 and 14, the spacing between the elbows 22 and 23 may be reduced, so as to bring the elbows closer together than the spacing between the fingers 13 and 14, by inclining the lower upturned portions of the members 20 and 21 towards each other at a greater angle.

The fabric layers constituting the "head" (including the tape 36) may be such as to fill or pack the space between the members 20 and 21. Although for clarity of illustration the fabric layer constituting the head is shown as a single ply of fabric (plus the layer representing the tape 36, which is cross-sectioned in FIGURE 11) yet in practice several layers or plies of fabric constitute the head of a drapery. When so packed, in practice, the two elbow-shaped members 20 and 21 also have the effect of pinching together the front-folds (26, 27 and 33) of the triple pleat in a zone near the bottom of the triple pleat, while the upper portions of the front-folds of such triple pleat may flare outwardly.

The present invention may be embodied in other specified forms without departing from the spirit or essential attributes thereof, and it is therefore desired that the present embodiments be considered in all respects as illustrative and not restrictive, reference being had to the appended claim rather than to the foregoing description to indicate the scope of the invention.

Having shown and described my invention, I claim the following:

A drapery-suspending and pleat-retaining device including four generally straight upright fingers, a cross-bar connecting the two outer fingers at their lower ends, the two inner fingers being welded to said cross-bar and having pleat-posturing members rigidly connected therewith and extending therefrom first downwardly and then forwardly beneath said cross-bar and having forwardly projecting stationary pleat-pinching elbows extending upwardly and converging towards each other from rear to front, and having upper terminal portions each extending between an outer finger and the adjacent inner finger and terminating in unconnected free ends generally rearwardly of said fingers.

References Cited in the file of this patent

UNITED STATES PATENTS

| | | |
|---|---|---|
| 2,558,467 | Solomon | June 26, 1951 |
| 2,623,582 | Handley | Dec. 30, 1952 |
| 2,623,583 | Handley | Dec. 30, 1952 |
| 2,758,645 | Sherman | Aug. 14, 1956 |
| 2,796,928 | Bernhard et al. | June 25, 1957 |